(12) United States Patent
Kuo

(10) Patent No.: US 6,930,970 B2
(45) Date of Patent: Aug. 16, 2005

(54) DISK POSITIONING DEVICE FOR AN OPTICAL DISK READING DEVICE

(75) Inventor: Tsung-Jung Kuo, Kaohsiung (TW)

(73) Assignee: Lite-On IT Corp. (TW)

( * ) Notice: Subject to any disclaimer, the term of this patent is extended or adjusted under 35 U.S.C. 154(b) by 258 days.

(21) Appl. No.: 10/158,241

(22) Filed: May 30, 2002

(65) Prior Publication Data

US 2003/0103434 A1 Jun. 5, 2003

(30) Foreign Application Priority Data

Dec. 4, 2001 (TW) .......................................... 90221079

(51) Int. Cl.⁷ .............................................. G11B 33/02
(52) U.S. Cl. .................................................... 369/77.1
(58) Field of Search .............................. 369/77.1, 75.1, 369/75.2; 360/99.02, 99.06, 99.07

(56) References Cited

U.S. PATENT DOCUMENTS

| | | | | |
|---|---|---|---|---|
| 5,166,917 A | * | 11/1992 | Decoster et al. | 369/77.1 |
| 5,173,894 A | * | 12/1992 | Kido | 369/77.1 |
| 5,416,763 A | * | 5/1995 | Ohsaki | 369/77.1 |
| 6,147,948 A | * | 11/2000 | Tanaka et al. | 369/77.1 |
| 6,469,971 B1 | * | 10/2002 | Sato et al. | 369/77.1 |
| 6,504,808 B2 | * | 1/2003 | Wada et al. | 369/75.2 |
| 6,512,730 B1 | * | 1/2003 | Lee et al. | 369/77.1 |

* cited by examiner

Primary Examiner—Angel Castro
(74) Attorney, Agent, or Firm—Raymond Sun

(57) ABSTRACT

A disk reading device has a housing having a disk receiving space provided therein, a first rod having a first guide pin, a second rod pivotably coupled to the first rod at a pivot point in a manner such that the first and second rods achieve a scissoring movement about the pivot point, with the second rod having a second guide pin. The device also includes a locking mechanism for locking the first and second rods at a fixed position, and a detection mechanism coupled to the first rod for detecting the size of a disk that is being inserted into the disk receiving space. The locking mechanism unlocks the first and second rods when a disk having a first size contacts the detection mechanism, and the locking mechanism maintains its lock on the first and second rods when a disk having a second size smaller than the first size is inserted into the disk receiving space.

15 Claims, 11 Drawing Sheets

DISK POSITIONING DEVICE FOR AN OPTICAL DISK READING DEVICE

BACKGROUND OF THE INVENTION

1. Field of the Invention

The present invention relates to an optical disk reading device, and in particular, to a positioning device for use in an optical disk reading device that can receive and position disks of different sizes.

2. Description of the Prior Art

Conventional optical disk reading devices, such as compact disk players, typically have a disk support tray that controls the insertion, ejection and carriage of the disk. In this regard, conventional disks have all been provided in a standard 12 cm diameter ("12 cm disk"), but recent developments have led to the common use of disks having a smaller 8 cm diameter ("8 cm disk").

In order for disks of both sizes to be used in the same compact disk player, it is necessary when positioning the disk on the disk support tray to make sure that the spindle table contacts the disk in a smooth operation. A rack is typically installed at the bottom of the disk support tray, and a motor drives a gear engaged with the rack to rotate the gear, causing the rack to move in and out while engaged with the gear. The disk support tray has a containing space for depositing a disk of 8 cm or 12 cm in diameter. However, while in use, it is impossible for a conventional compact disk player to know which type of disk the user is depositing. Therefore, the conventional compact disk player uses as its positioning basis the standard 12 cm disk. As a result, when an 8 cm disk is inserted, it may be difficult or impossible to properly position the disk, resulting in a read failure when it attempts to read an 8 cm disk. In other words, a conventional compact disk player is unable to detect the size differences between the disks, and does not have any mechanism that is adapted for doing so.

Thus, there remains a need for an optical disk reading device that can receive and read both 8 cm disks and 12 cm disks.

SUMMARY OF THE DISCLOSURE

It is an object of the present invention to provide an optical disk reading device that can receive and read both 8 cm disks and 12 cm disks.

It is another object of the present invention to provide an optical disk reading device that can identify the size of the disk being inserted.

In order to accomplish the objects of the present invention, the present invention provides a disk reading device having a housing having a disk receiving space provided therein, a first rod having a first guide pin, a second rod pivotably coupled to the first rod at a pivot point in a manner such that the first and second rods achieve a scissoring movement about the pivot point, with the second rod having a second guide pin. The device also includes a locking mechanism for locking the first and second rods at a fixed position, and a detection mechanism coupled to the first rod for detecting the size of a disk that is being inserted into the disk receiving space. The locking mechanism unlocks the first and second rods when a disk having a first size contacts the detection mechanism, and the locking mechanism maintains its lock on the first and second rods when a disk having a second size smaller than the first size is inserted into the disk receiving space.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Although the principles of the present invention are described below in connection with a pull-in type of compact disk player, the present invention can be applied to all optical disk reading devices, including but not limited to CD drives, DVD drives, CD/DVD drives, DVD/RW combo drives, car audio drives, etc.

Figure 1:
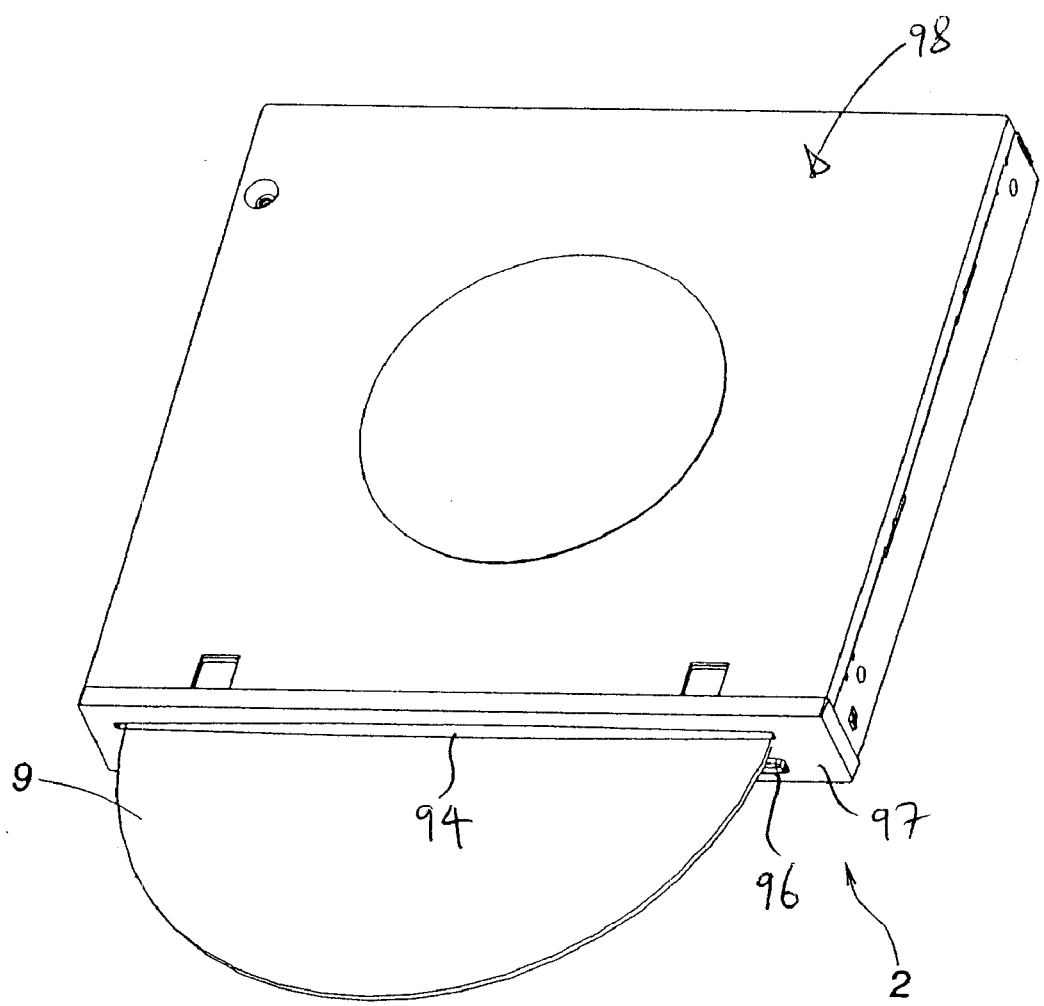
FIG. 1 is a top perspective view of an optical disk reading device according to the present invention.
Figure 2:
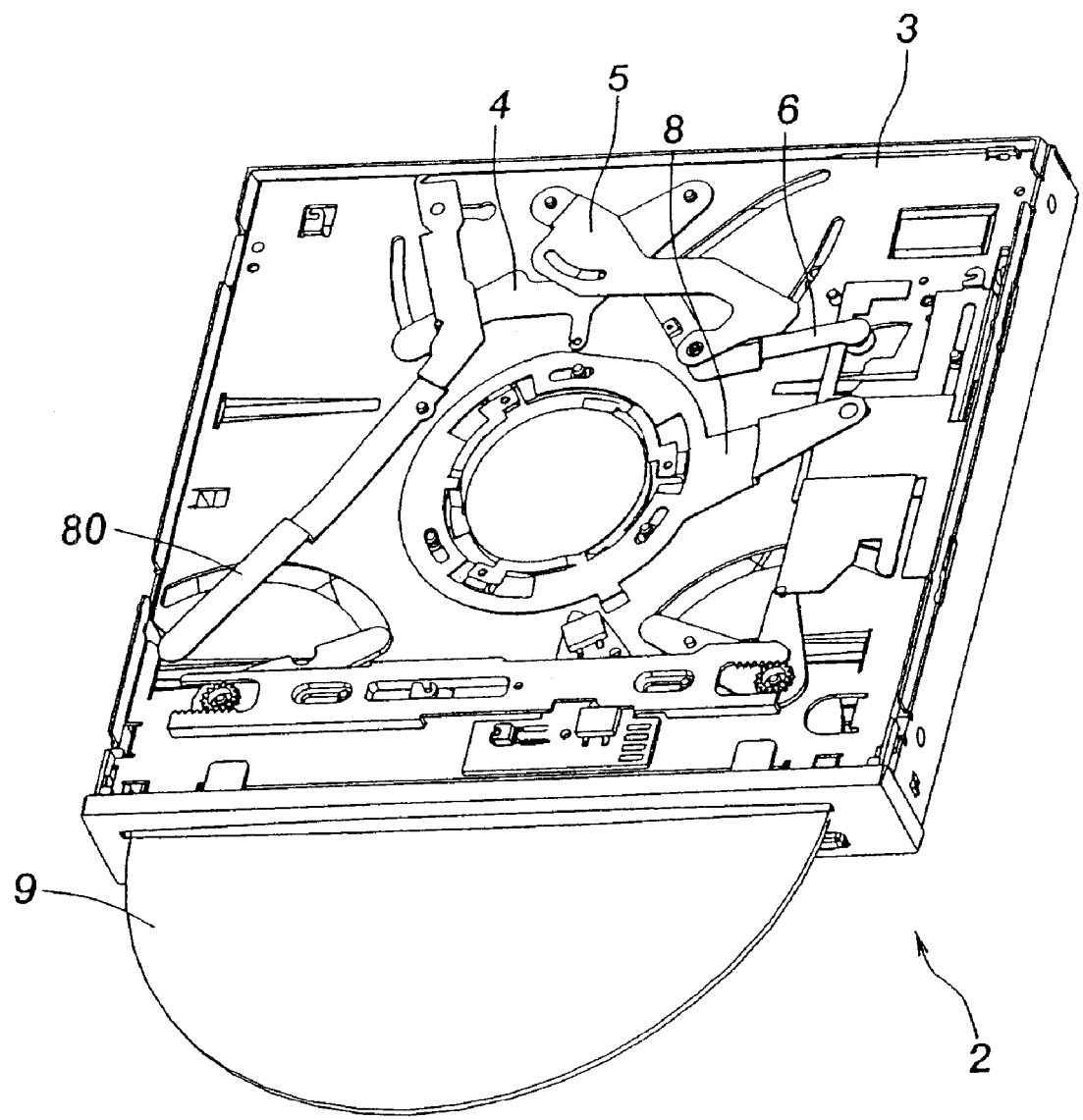
FIG. 2 is a top perspective view of the device of FIG. 1 with the top cover removed.
Figure 3:
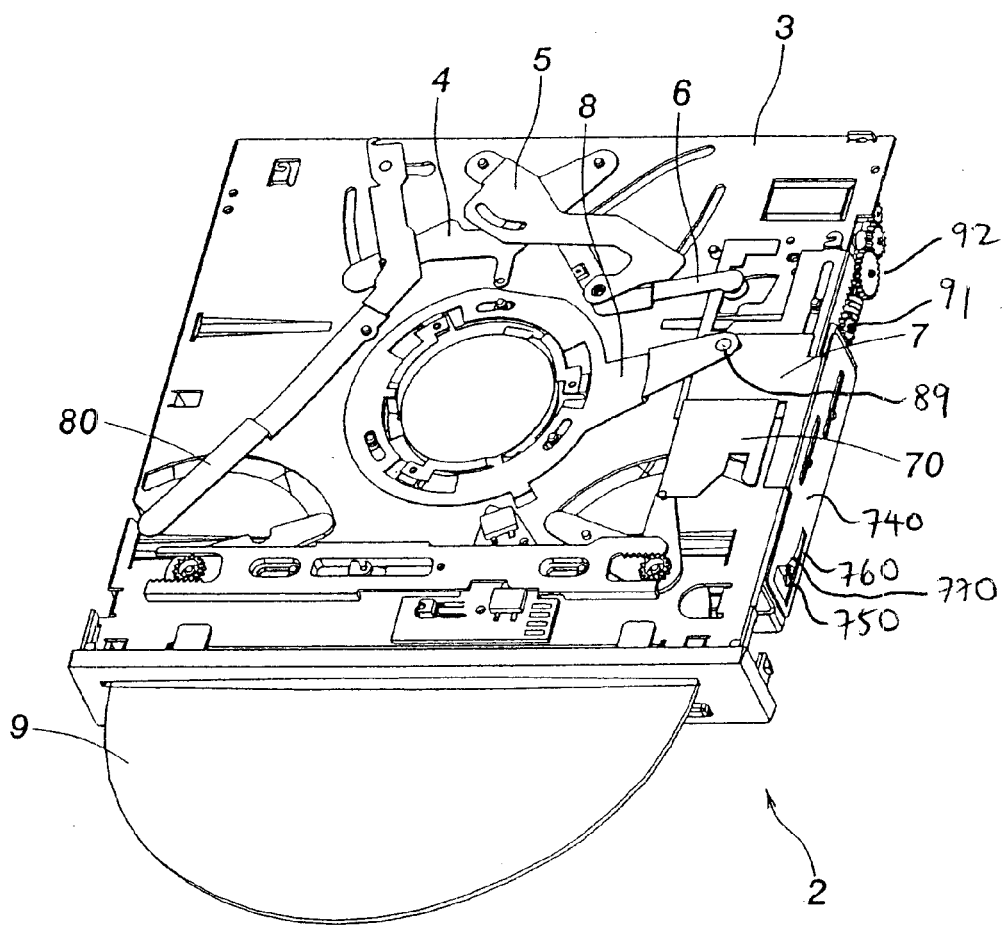
FIG. 3 is a top perspective view of the device of FIG. 1 with the top and bottom covers removed.

FIGS. 2–8 illustrate an optical disk reading device 2 according to one embodiment of the present invention. The present invention utilizes a connecting rod type positioning device for positioning a compact disk in a compact disk player 2. The positioning device is installed on a substrate 3 inside the housing 98 of a compact disk player 2 without the use of a disk support tray. FIGS. 2 and 3 best illustrate the interconnections of the various components of the positioning device with respect to the substrate 3.

Figure 4:
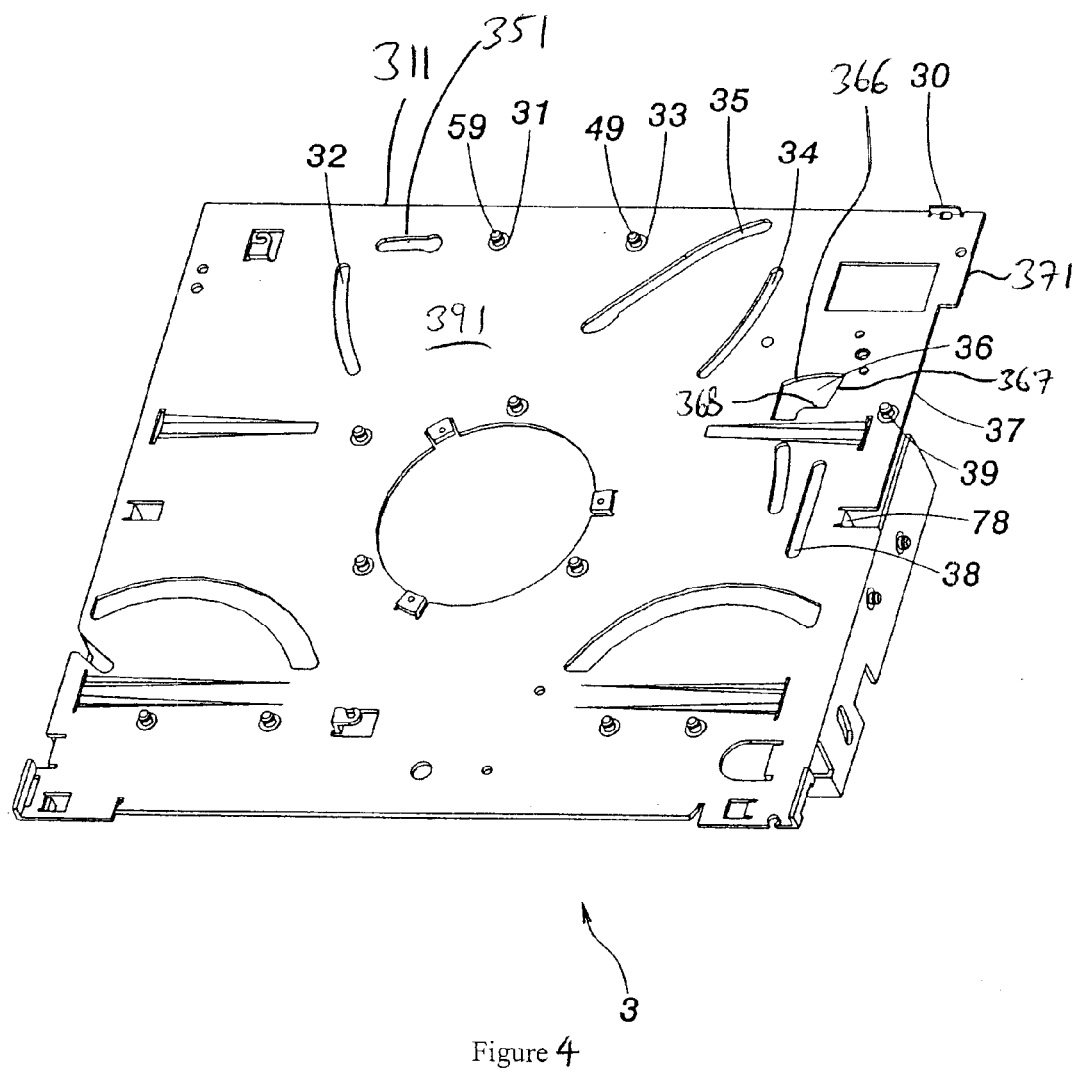
FIG. 4 is a top perspective view of the substrate of the device of FIG. 1.
Figure 5:
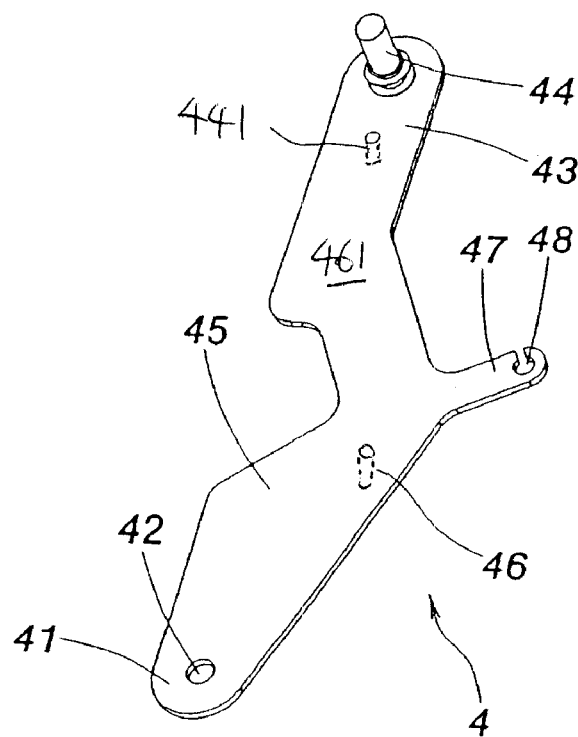
FIG. 5 is a bottom perspective view of the bottom left connecting rod of the device of FIG. 1.
Figure 6:
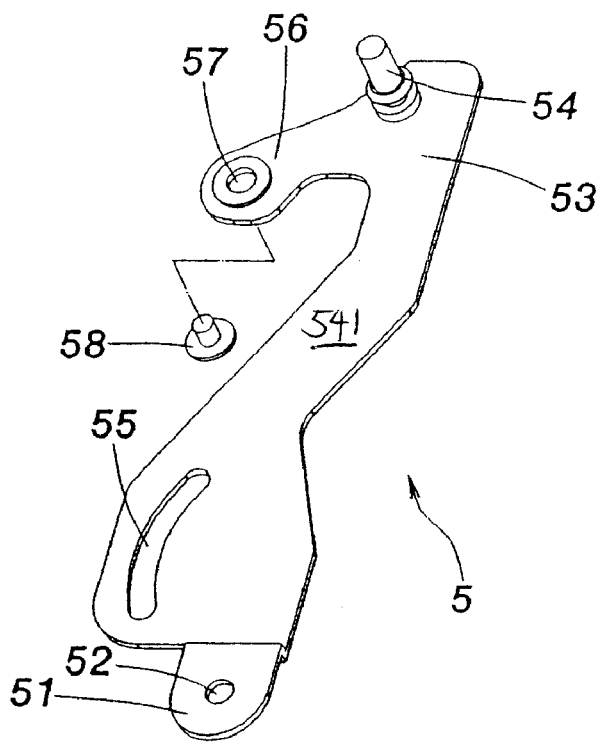
FIG. 6 is a bottom perspective view of the top right connecting rod of the device of FIG. 1.
Figure 7:
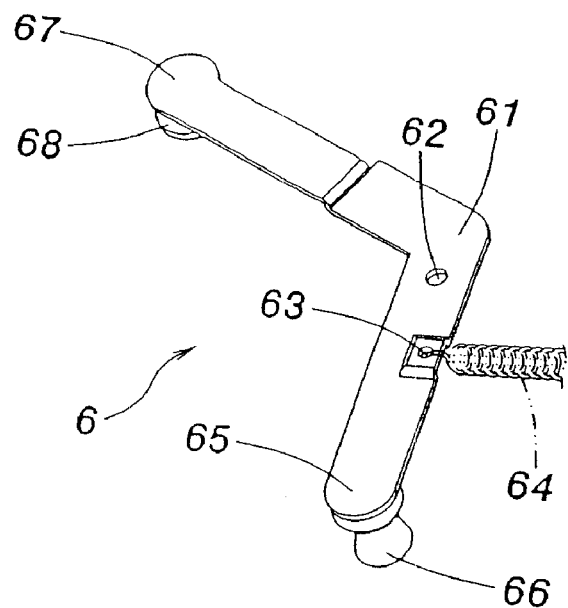
FIG. 7 is a top perspective view of the crank arm of the device of FIG. 1.

As best shown in FIGS. 2–4, the substrate 3 has a left puncture hole 31, a right puncture hole 33, a left curved groove 32, a right curved groove 34, a middle curved groove 35, and a rear groove 351, all positioned adjacent the rear edge 311. The substrate 3 also has a guide groove 36 positioned near the right curved groove 34, an edge groove 37 positioned along a right side edge 371 of the substrate 3, and a linear groove 38 positioned adjacent the right side edge 371 and the edge groove 37. In addition, the substrate 3 includes a back positioning pin 39 positioned between the guide groove 36 and the edge groove 37, a fixing tab 30 provided along the rear edge 311 adjacent the right side edge 371, and a positioning point 78 provided at one end of the edge groove 37 adjacent the linear groove 38.

A bottom left connecting rod 4 (shown in detail in FIG. 5) and a top right connecting rod 5 (shown in detail in FIG. 6) are operatively coupled together to achieve a scissoring effect between them, where the rods 4 and 5 define a general "X" configuration. In particular, the right puncture hole 33 of the substrate 3 is pivotally connected to the bottom left connecting rod 4. A right pivot 49 is fitted in the right puncture hole 33 and pivotally couples a left positioning hole 42 that is provided at the left inside tip 41 of the bottom left connecting rod 4. The bottom left connecting rod 4 has a right outside tip 43 which has a left guide pin 44 extending from the bottom surface 461 of the rod 4, with the left guide pin 44 adapted to extend through and travel within the left curved groove 32 of the substrate 3. A holding pin 46 extends from the top surface of the rod 4 at about the midpoint 45 of the rod 4, and a locking pin 441 extends from the top surface of the rod 4 at a location adjacent the left guide pin 44.

Similarly, the left puncture hole 31 of the substrate 3 is pivotally connected to the top right connecting rod 5. A left pivot 59 is fitted in the right puncture hole 31 and pivotally couples a positioning hole 52 that is provided on a left inside extension 51 of the top right connecting rod 5. The top right connecting rod 5 has a right outside tip 53 which has a right guide pin 54 positioned on the bottom surface 541 of the rod 5, and which is adapted to extend through and travel within the right curved groove 34.

The holding pin 46 of the bottom left connecting rod 4 extends through a holding curved groove 55 that is provided adjacent the positioning hole 52 on top of the right connecting rod 5, so that the top right connecting rod 5 crosses and overlaps with the bottom left connecting rod 4 in a manner similar to a pair of scissors, and with the top right connecting rod 5 positioned above the bottom left connecting rod 4 when viewed from the orientation of FIG. 3.

The top right connecting rod 5 also has a left extension part 56 that extends from the right outside tip 53. A hole 57 is provided on the left extension part 56, and is adapted to receive a connecting pin 58. The connecting pin 58 also extends through a positioning hole 62 in a middle bending point 61 of a crank arm 6 (see FIG. 7) so as to pivotally couple the left extension part 56 with the middle bending point 61 of the crank arm 6. As shown in FIGS. 2 and 3, the crank arm 6 is positioned beneath the top right connecting rod 5, and above the substrate 3.

Figure 8:
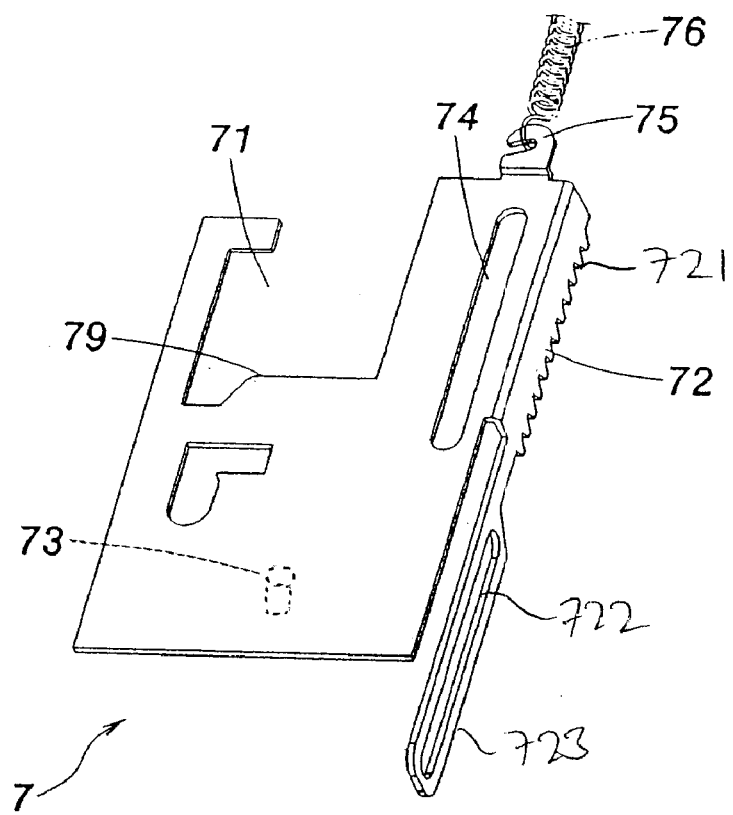
FIG. 8 is a top perspective view of the sliding plate of the device of FIG. 1.

In addition, an elastic member 64 (which can be a spring, see FIGS. 7 and 9) connects a hole 63 provided between a left end 65 and the middle bending point 61 of the crank arm 6 to a central extension 47 that extends from the middle of the bottom left connecting rod 4. In particular, one end of the elastic member 64 is hooked to a hole 48 of the central extension 47 and the other end of the elastic member 64 is hooked to the hole 63 of the crank arm 6. The left end 65 of the crank arm 6 carries a first middle guide pin 66 that extends through and travels within the middle curved groove 35 of the substrate 3. The crank arm 6 also has a right end 67 that carries a second guide pin 68 which is operatively coupled to a sliding plate 7 that is illustrated in FIG. 8. In particular, the second guide pin 68 is adapted to travel through a cut-out space 71 adjacent the rear of the sliding plate 7, and through the guide groove 36 of the substrate 3. The sliding plate 7 also has a right folded edge 72 that extends transversely from the general plane of the sliding plate 7. The folded edge 72 has a rack of teeth 721 and an elongated hole 722 provided in an extension 723 that extends from the rack of teeth 721. The sliding plate 7 has a positioning pin 73 (shown in phantom in FIG. 8) on its bottom surface that is received in and travels along the straight groove 38 of the substrate 3 to operatively couple the sliding plate 7 to the substrate 3. The top surface 391 of the substrate 3 also has a back positioning pin 39 that is positioned adjacent the edge groove 37. The back positioning pin 39 extends through, and travels along, an elongate hole 74 on the sliding plate 7 adjacent the right folded edge 72. The straight groove 38 on the substrate 3 is parallel to the elongate hole 74 on the sliding plate 7 so that the sliding plate 7 is guided to move in a linear fashion along the substrate 3 by the straight groove 38 and the elongate hole 74. In addition, an elastic member 76 (e.g., a spring) has opposing ends that are connected to the fixing tab 30 and a protruding tab hook 75 at the rear of the sliding plate 7.

A sliding piece 70 is positioned in front of the sliding plate 7. The sliding piece 70 has a side wall 740 that includes a generally L-shaped slot 760 with an upper curved edge 770. The shaft 750 of one or more gripping rollers (not shown) is positioned for movement inside the slot 760. The side wall 740 is parallel to and extends over the right folded edge 72 of the sliding plate 7.

Figure 12:
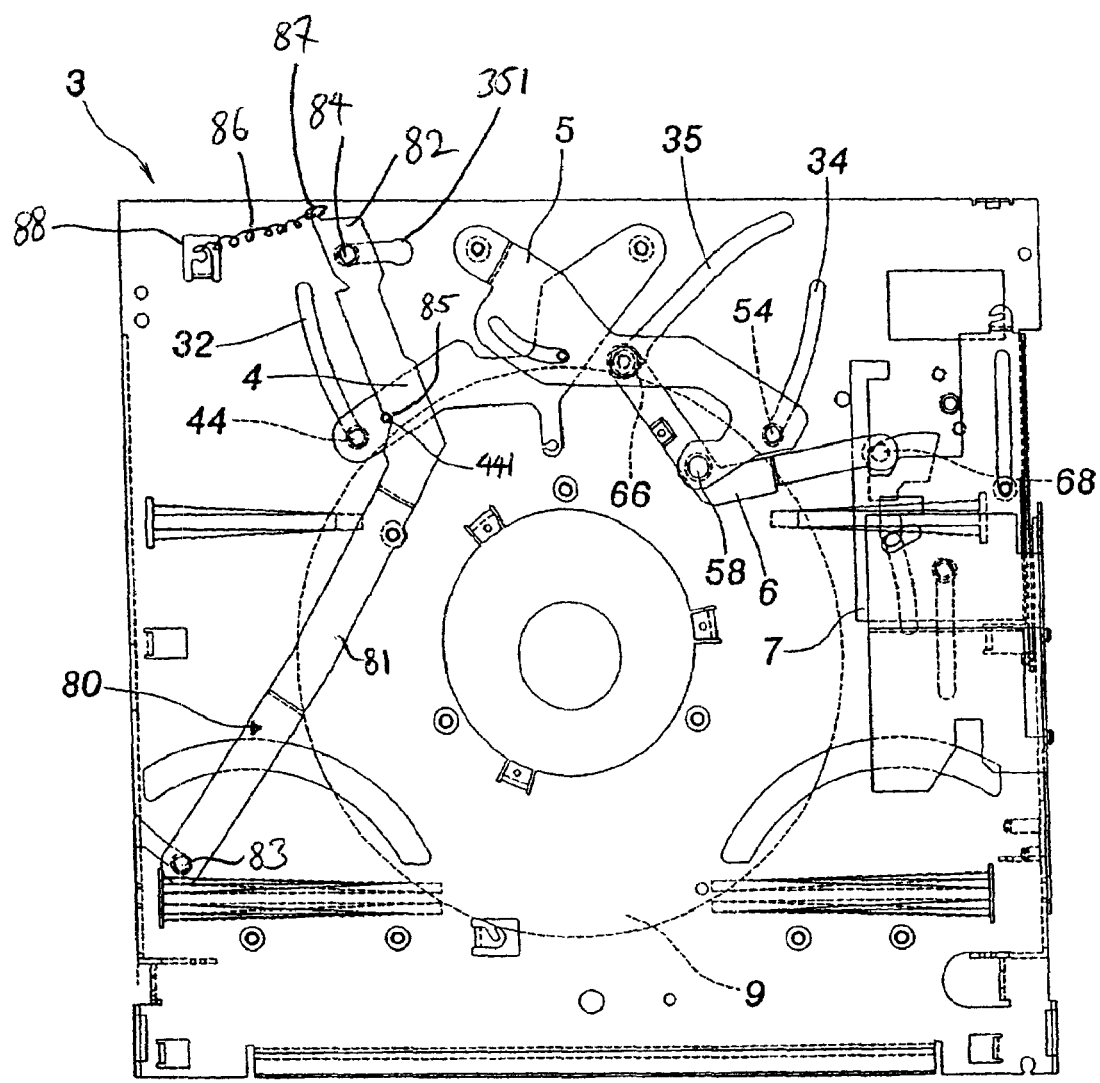
FIGS. 12–13 illustrate how an 8 cm disk can be inserted into the device of FIG. 1.

In addition to the above, as best shown in FIG. 12, a locking and release rod 80 is provided that has an angled configuration, with a first straight section 81 and a second straight section 82 that are angled with respect to each other. The front end of the first straight section 81 has a guide pin 83 (see FIG. 12) that is pivotally secured to the bottom surface of the first straight section 81, and the rear end of the second straight section 82 has a guide pin 84 that extends through, and travels along, the rear groove 351 of the substrate. An elastic member 86 (e.g., a spring) has opposing ends connected to a hook 87 at the rear end of the second straight section 82 and a post 88 secured to the substrate 3. The elastic member 86 functions to normally bias the hook 87 towards the post 88. A notch 85 is provided along a side edge of the locking and release rod 80 at about the location where the first and second straight sections 81 and 82 connect, and is adapted to releasably engage the locking pin 441 on the bottom left connecting rod 4.

When there is no disk 9 positioned inside the compact disk player 2, the locking pin 441 is engaged by the notch 85, which prevents the bottom left connecting rod 4 from moving in any direction, thereby locking the positions of the bottom left connecting rod 4 and the top right connecting rod 5 (which are coupled via the pin 46 and the groove 55).

After a disk 9 (having a diameter of either 8 cm or 12 cm) is inserted inside compact disk player 2, the disk 9 will contact the middle guide pin 66 (if an 8 cm disk is being inserted), or the left guide pin 44 and right guide pin 54 (if a 12 cm disk is being inserted), to cause the bottom left connecting rod 4 and the top right connecting rod 5 to pivot like a pair of scissors.

Figure 9:
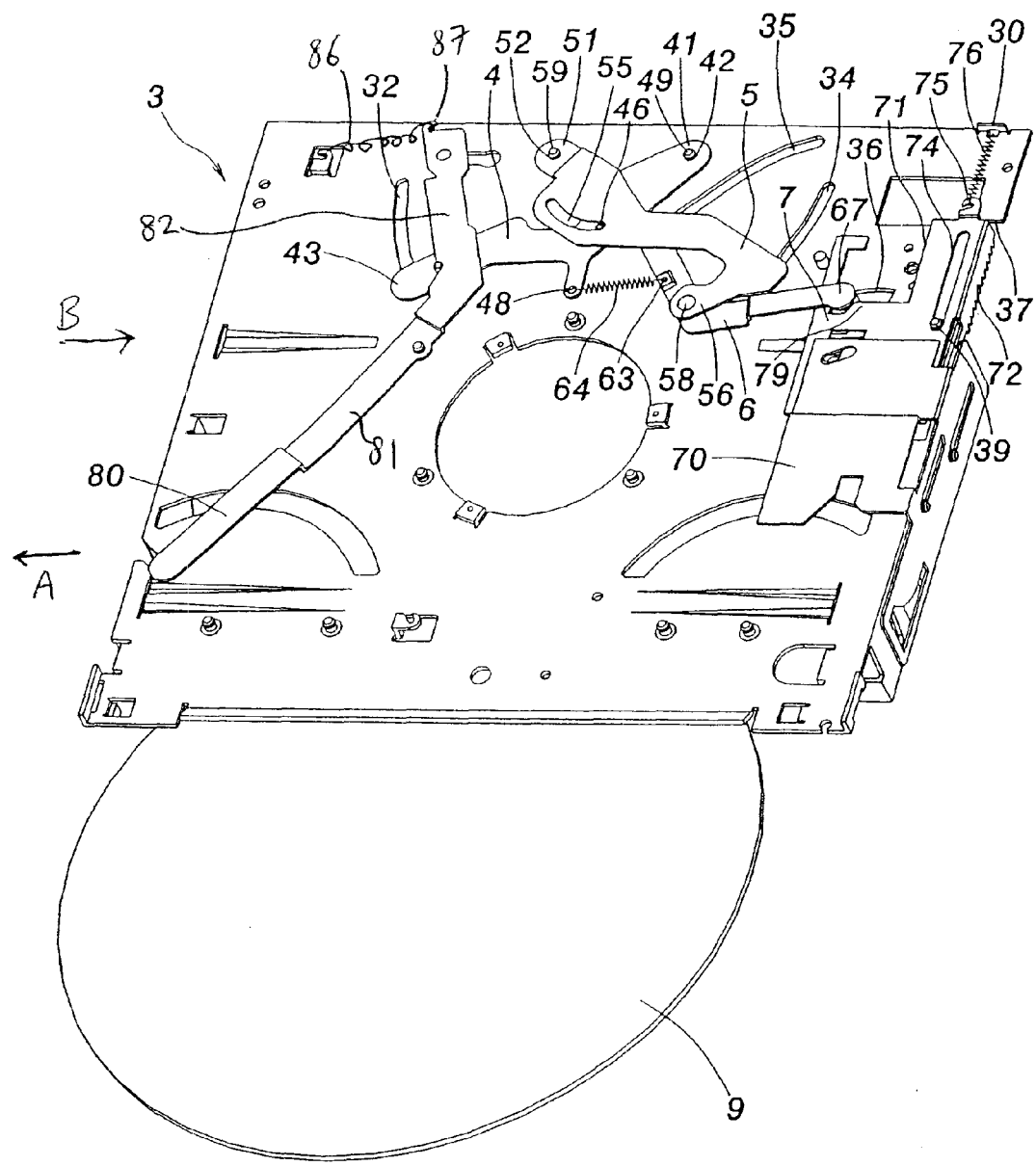
FIGS. 9–11 illustrate how a 12 cm disk can be inserted into the device of FIG. 1.
Figure 10:
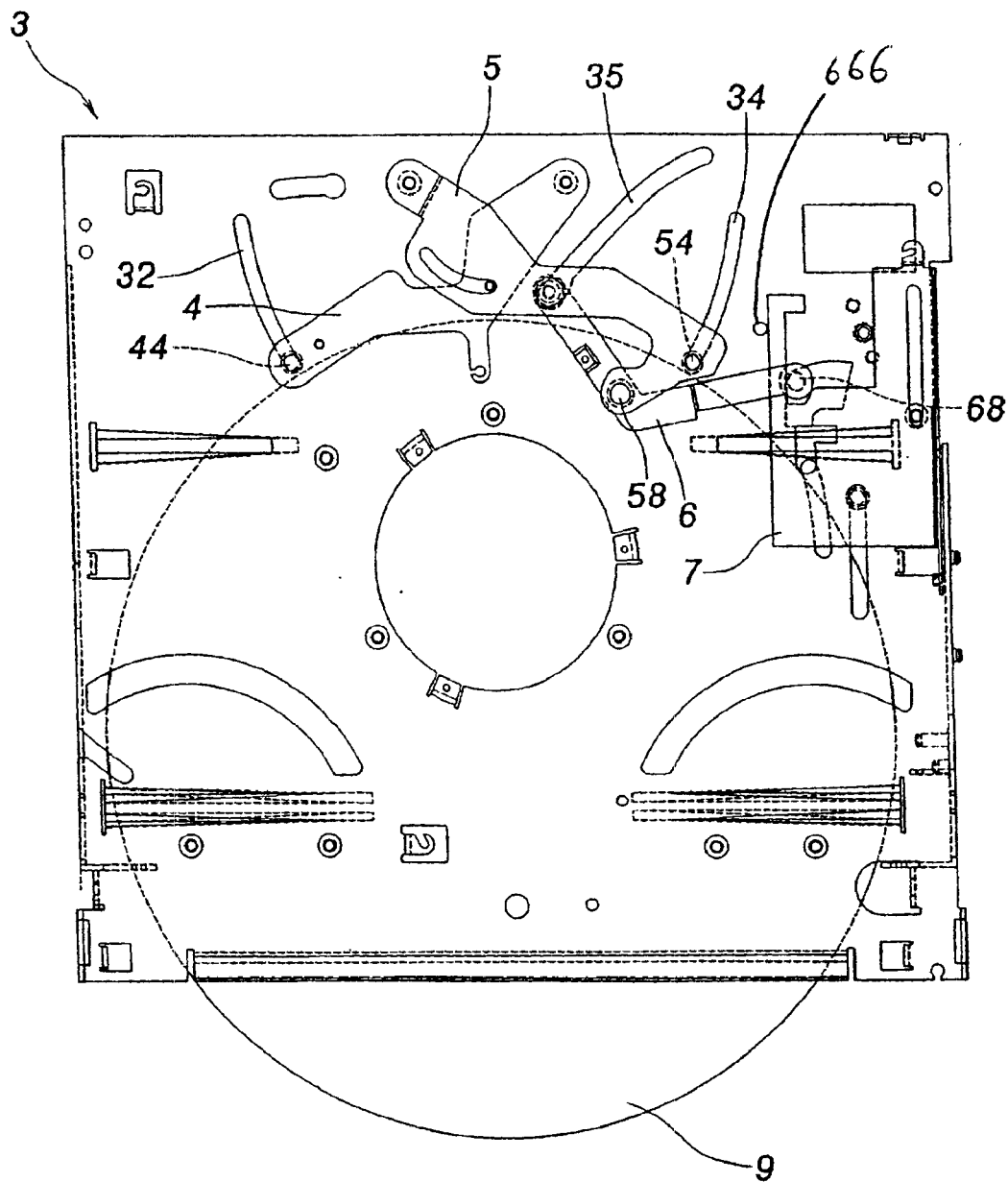
Figure 11:
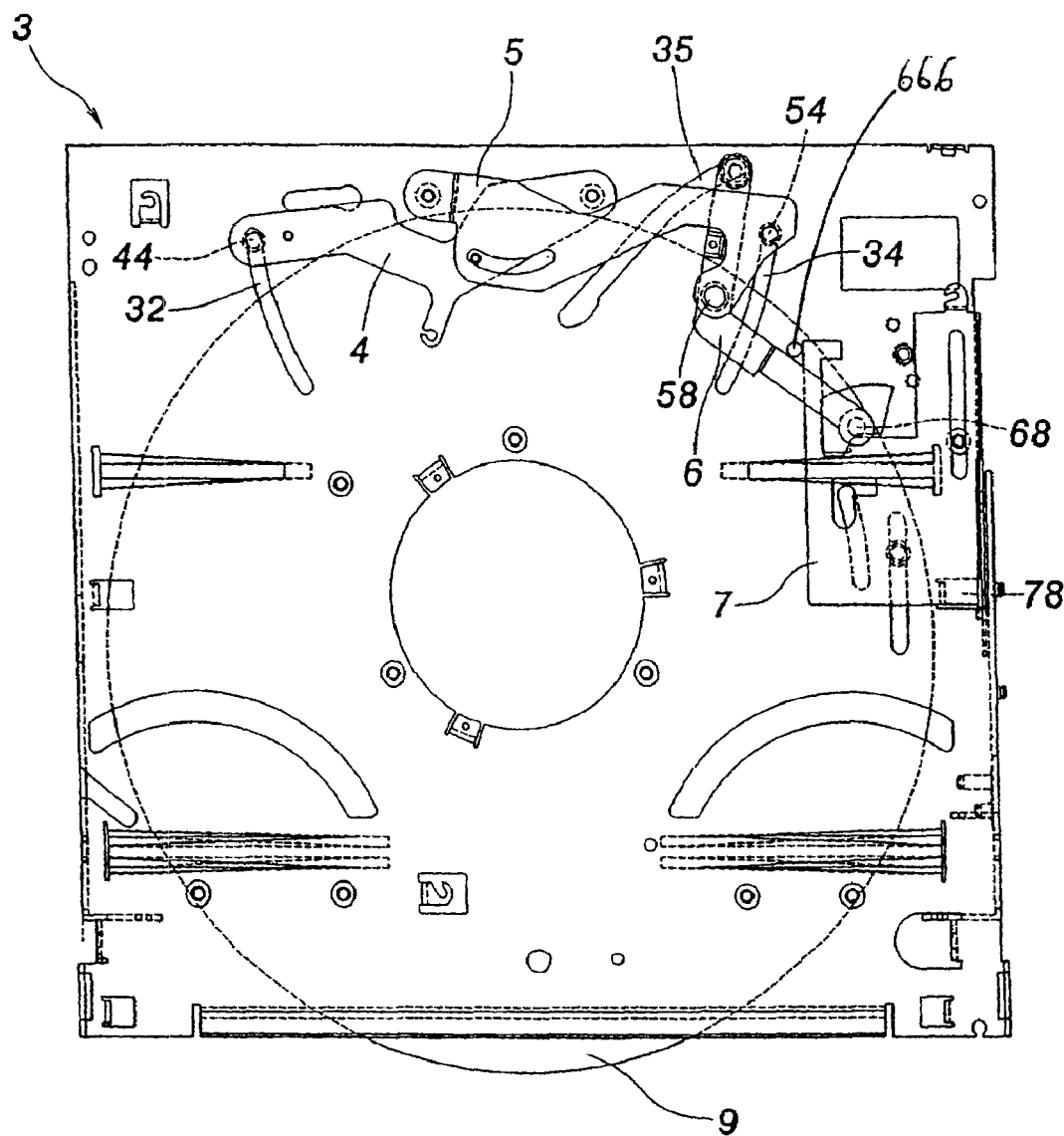

FIGS. 9–11 illustrate how a 12 cm disk 9 can be positioned inside the compact disk player 2. When the 12 cm disk 9 is inserted into the compact disk player 2, the 12 cm disk 9 will contact the pin 83 and push the pin 83 outwardly in the direction of arrow A in FIG. 9, thereby causing the first and second straight sections 81 and 82 to pivot in the opposite direction represented by the arrow B in FIG. 9 (and overcoming the normal bias of the elastic member 86). As the first and second straight sections 81 and 82 pivot in the direction of arrow B, the pin 84 travels along the rear groove 351 and the locking pin 441 becomes disengaged from the notch 85, unlocking the left bottom connecting rod 4 so that the two connecting rods 4 and 5 can now be scissored. As the disk 9 is inserted further, the disk 9 will contact the left guide pin 44 and right guide pin 54 which function to guide the positioning of the 12 cm disk 9 during insertion thereof. See FIG. 10.

As the disk 9 pushes the left guide pin 44 and right guide pin 54 rearwardly, the left guide pin 44 and right guide pin 54 will travel rearwardly in the left curved groove 32 and the right curved groove 34, respectively, and will also cause the bottom left connecting rod 4 and the top right connecting rod 5 to pivot in a rearward direction. During this rearward pivot, the holding pin 46 will travel from a right end of the groove 55 towards a left end of the groove 55. As the left guide pin 44 and the right guide pin 54 move rearwardly along the left curved groove 32 and the right curved groove 34, the middle guide pin 66 of crank arm 6 is caused (by the pivoting connection of the crank arm 6 to the top right connecting rod 5) to travel rearwardly along middle curved groove 35, thereby causing the second guide pin 68 on the other end of the crank arm 6 to travel along the rear curved edge 366 of the guide groove 36 (see FIG. 4, and compare FIGS. 10 and 11) until the crank arm 6 contacts a stop post 666 (see FIG. 11). At this time, the second guide pin 68 will move forwardly along a right side edge 367 of the guide groove 36 until it reaches a step-like front edge 79 of the groove 71. The second guide pin 68 will then push the sliding plate 7 forwardly to the positioning point 78. The second guide pin 68 will continue to push the sliding plate 7 forwardly until the front edge 79 is aligned with the front edge 368 of the guide groove 36, which defines the limit of movement for the second guide pin 68. In this position, the holding pin 46 is at the left end of the groove 55. Thus, the opposing left and right ends of the groove 55 define the limits by which the connecting rods 4 and 5 can scissor.

In the mean time, the forward motion of the sliding plate 7 means that the teeth 721 on the folded edge 72 of the sliding plate 7 will engage the teeth on a first gear 91 (see FIG. 3) positioned along the edge groove 37 of the substrate 3. The first gear 91 is driven by a second gear system 92 that is aligned with the first gear 91 along the edge groove 37, with the second gear system 92 being driven by a motor (not shown) of the compact disk player 2. The first gear 91 will then drive the sliding plate 7 forward via the engagement between the teeth of the first gear 91 and the teeth 721 on the folded edge 72. The forward motion of the sliding plate 7 will contact an arm 89 of the disk spindle table 8 and push the arm 89 forward. The arm 89 connects the sliding piece 70 to the disk spindle table 8. As the arm 89 moves forwardly, the disk spindle table 8 is rotated towards the front in a clockwise direction as viewed from the orientation of FIG. 3, and the sliding piece 70 is also pushed forwardly. As the sliding piece 70 moves forwardly, the shaft 750 of the gripping rollers travels down along the curved upper edge 770 of the slot 760, from the front to the rear of the slot 760, thereby pushing one or more gripping rollers downward to close the opening 94 of the housing 98 of the compact disk player 2. The disk 9 is now positioned in the center of the compact disk player 2 and is ready to be read.

To eject the 12 cm disk 9 from the compact disk player 2, the user merely presses the eject button 96 provided on the front panel 97 of the housing 98. This will activate the gears 91 and 92 to move in a reverse direction, pulling the sliding piece 70 and sliding plate 7 rearwardly, which will cause the shaft 750 of the gripping rollers to travel from rear to front and up along the curved upper edge 770 of the slot 760, thereby pushing one or more gripping rollers upward to grip and eject the disk 9 via the opening 94. As the disk 9 leaves the space inside the housing 98, the elastic member 64 will bias the connecting rods 4 and 5 together, causing the connecting rods 4 and 5 to scissor and move towards the front until the holding pin 46 reaches the right end of the groove 55 again, as shown in FIG. 9. Simultaneously, the elastic member 86 will bias the rod 80 towards the post 88 (with the pin 84 traveling from right to left inside the rear groove 351), until the locking pin 441 is engaged by the notch 85 to lock the connecting rods 4 and 5.

Figure 13:
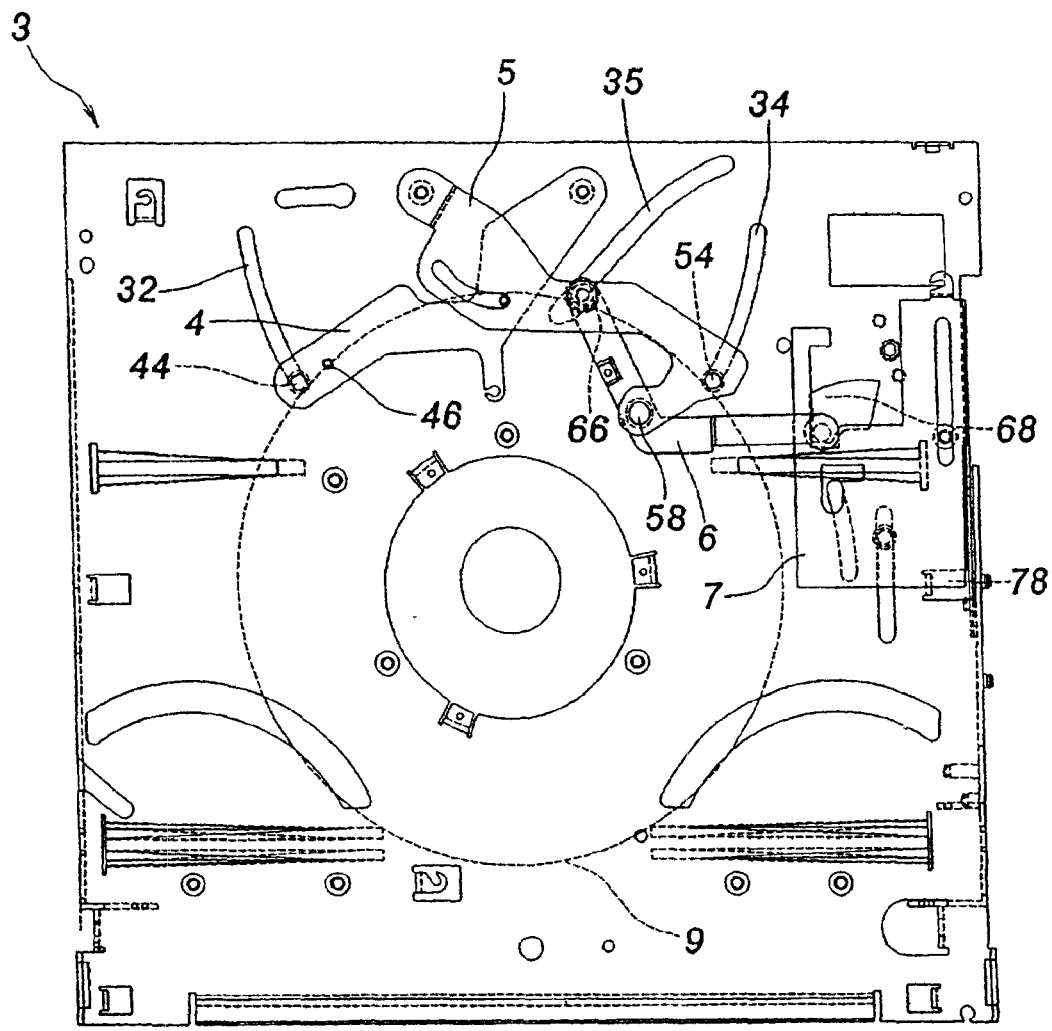

FIGS. 12–13 illustrate how an 8 cm disk 9 can be positioned inside the compact disk player 2. When the 8 cm disk 9 is inserted into the compact disk player 2, the smaller diameter of the 8 cm disk 9 means that the disk 9 will not contact the pin 83, so the connecting rods 4 and 5 will remain locked because the locking pin 441 will continue to be engaged by the notch 85. Because the 8 cm disk 9 has a smaller surface area than the substrate 3, the 8 cm disk 9 may deviate to the left or to the right during its insertion into the housing 98. In this regard, the left guide pin 44 and the right guide pin 54 (which are locked in place in the configuration shown in FIG. 12 because their respective connecting rods 4 and 5 are locked in place) will function to guide the 8 cm disk 9 by defining the left and right limits by which the disk 9 may deviate. As a result, the 8 cm disk 9 will automatically be guided to be positioned in the center of the housing 98. As the disk 9 is inserted further, the disk 9 will contact the middle guide pin 66 of the crank arm 6, pushing the middle guide pin 66 rearwardly for a short distance along the middle curved groove 35. The crank arm 6 is pivoted about the connecting pin 58, thereby causing the second guide pin 68 on the crank arm 6 to move in the guide groove 36 in the same manner described above, so as to push the sliding plate 7 forwardly to the positioning point 78.

In the mean time, the forward motion of the sliding plate 7 means that the teeth 721 on the folded edge 72 of the sliding plate 7 will engage the teeth on the first gear 91 (see FIG. 3) to cause the sliding plate 7 and sliding piece 70 to move forwardly in the same manner described above to lower the gripping rollers to close the opening 94 of the housing 98 of the compact disk player 2. The 8 cm disk 9 is now positioned in the center of the compact disk player 2 and is ready to be read.

To eject the 8 cm disk 9 from the compact disk player 2, the user merely presses the eject button 96 provided on the front panel 97 of the housing 98. The ejection of an 8 cm disk is the same as for a 12 cm disk as described above. In particular, the gears 91 and 92 will be activated to move in a reverse direction, causing the gripping rollers to move up and to grip and eject the disk 9 via the opening 94 in the same manner described above. Since the rods 80, 4 and 5 remain locked, no action occurs with these elements.

Thus, the present invention utilizes an automatic positioning device having X-shaped or scissoring rods that can automatically guide the positioning of both a 12 cm disk and an 8 cm disk into the center of a pull-in type of compact disk player. The positioning device of the present invention can identify (i.e., via the locking and release rod 80) the size of the disk 9 being inserted, and based thereon, accomodate the proper positioning of the disk 9.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A disk reading device, comprising:
   a housing having an opening which communicates with a disk receiving space provided therein;
   a first rod positioned inside the disk receiving space, the first rod having a first guide pin;
   a second rod positioned inside the disk receiving space and pivotably coupled to the first rod at a pivot point in a manner such that the first and second rods achieve a scissoring movement about the pivot point, the second rod having a second guide pin;

a third rod positioned inside the disk receiving space and having a detection pin and a notch that releasably engages the first rod to lock and unlock the first and second rods;

a sliding plate positioned inside the disk receiving space;

a crank arm positioned inside the disk receiving space and pivotably coupled to the second rod and the sliding plate, the crank arm having a third guide pin; and wherein a disk being inserted into the disk receiving space pushes the third guide pin to cause the crank arm to push the sliding plate towards the opening of the housing to raise.

2. The device of claim 1, wherein the third rod unlocks the first and second rods when a disk having a first size contacts the detection pin, and wherein the third rod maintains its lock on the first and second rods when a disk having a second size smaller than the first size is inserted into the disk receiving space.

3. The device of claim 1, further including a disk spindle table having an arm that is operatively coupled to the sliding plate.

4. The device of claim 1, wherein the sliding plate has a groove, and the crank arm has a fourth guide pin that extends through and travels within the groove on the sliding plate when the crank arm is pivoted.

5. The device of claim 1, further including a substrate positioned in the housing, the substrate having a first groove through the first guide pin extends and travels, a second groove through the second guide pin extends and travels, and a third groove through the third guide pin extends and travels.

6. A disk reading device, comprising:

a housing having an opening which communicates with a disk receiving space provided therein;

a first rod positioned inside the disk receiving space, the first rod having a first guide pin and a locking pin;

a second rod positioned inside the disk receiving space and pivotably coupled to the first rod at a pivot point in a manner such that the first and second rods achieve a scissoring movement about the pivot point, the second rod having a second guide pin; and a third rod positioned inside the disk receiving space and having a detection pin and a notch that releasably engages the locking pin of the first rod to lock and unlock the first and second rods;

wherein a disk that is inserted into the disk receiving space pushes the detection pin to cause the locking pin to disengage from the notch.

7. An assembly, comprising:

a first disk;

a second disk that is smaller than the first disk; and a disk reading device comprising:

a housing having an opening which communicates with a disk receiving space provided therein;

a first rod positioned inside the disk receiving space, the first rod having a first guide pin and a locking pin;

a second rod positioned inside the disk receiving space and pivotably coupled to the first rod at a pivot point in a manner such that the first and second rods achieve a scissoring movement about the pivot point, the second rod having a second guide pin; and a third rod positioned inside the disk receiving space and having a detection pin and a notch that releasably engages the locking pin of the first rod to lock and unlock the first and second rods;

wherein insertion of the first disk into the disk receiving space pushes the detection pin to cause the locking pin to disengage from the notch, while the second disk does not contact the detection pin when the second disk is inserted into the disk receiving space.

8. The assembly of claim 7, further including means pivotably coupled to the second rod for raising and lowering a gripping roller.

9. The assembly of claim 8, wherein the housing has an opening that leads into the disk receiving space, and wherein the raising and lowering means includes:

a sliding plate; and a crank arm pivotably coupled to the second rod and the sliding plate, the crank arm having a third guide pin;

wherein insertion of the second disk into the disk receiving space pushes the third guide pin to cause the crank arm to push the sliding plate towards the opening of the housing.

10. The assembly of claim 9, further including a disk spindle table having an arm that is operatively coupled to the sliding plate.

11. The assembly of claim 9, wherein the sliding plate has a groove, and the crank arm has a fourth guide pin that extends through and travels within the groove on the sliding plate when the crank arm is pivoted.

12. The assembly of claim 7, further including a substrate positioned in the housing, the substrate having a first groove through the first guide pin extends and travels, and a second groove through the second guide pin extends and travels.

13. The assembly of claim 7, wherein the first and second guide pins define the limits of sideway movement to center the second disk.

14. The assembly of claim 7, wherein the first and second guide pins are pushed by the first disk when the first disk is inserted into the disk receiving space.

15. A disk reading device, comprising:

a housing having a disk receiving space provided therein;

a first rod positioned inside the disk receiving space, the first rod having a first guide pin;

a second rod positioned inside the disk receiving space and pivotably coupled to the first rod at a pivot point in a manner such that the first and second rods achieve a scissoring movement about the pivot point, the second rod having a second guide pin; and a crank arm positioned inside the disk receiving space and pivotably coupled to the second rod, the crank arm having a third guide pin;

wherein a first disk having a first size will contact the first and second guide pins, but not contact the third guide pin, when the first disk is inserted into the disk receiving space; and wherein a second disk having a second size smaller than the first size will contact the third guide pin when the second disk is inserted into the disk receiving space.

* * * * *